(12) United States Patent
Bower et al.

(10) Patent No.: US 11,661,180 B2
(45) Date of Patent: May 30, 2023

(54) SYSTEMS AND METHODS FOR POWER DISTRIBUTION IN ELECTRIC AIRCRAFT

(71) Applicant: Archer Aviation, Inc., Santa Clara, CA (US)

(72) Inventors: Geoffrey C. Bower, Sunnyvale, CA (US); Benjamin M. Greek, Orinda, CA (US); Nathan T. Depenbusch, San Jose, CA (US); John Melack, Redwood City, CA (US)

(73) Assignee: Archer Aviation Inc., San Diego, CA (US)

( * ) Notice: Subject to any disclaimer, the term of this patent is extended or adjusted under 35 U.S.C. 154(b) by 348 days.

(21) Appl. No.: 16/923,939

(22) Filed: Jul. 8, 2020

(65) Prior Publication Data
US 2022/0009625 A1    Jan. 13, 2022

(51) Int. Cl.
  *B64C 29/00* (2006.01)
  *B64D 27/24* (2006.01)
  *H02J 7/00* (2006.01)

(52) U.S. Cl.
  CPC .......... *B64C 29/0033* (2013.01); *B64D 27/24* (2013.01); *H02J 7/0063* (2013.01); *B60L 2200/10* (2013.01); *B64D 2221/00* (2013.01)

(58) Field of Classification Search
  CPC .. B64C 29/0033; B64D 27/24; B64D 2221/00
  See application file for complete search history.

(56) References Cited

U.S. PATENT DOCUMENTS

| 5,612,579 A | 3/1997 | Wisbey et al. |
| 6,344,700 B1 | 2/2002 | Eisenhauer et al. |

(Continued)

FOREIGN PATENT DOCUMENTS

| EP | 3303124 A1 | 12/2016 |
| EP | 3184425 † | 6/2017 |

(Continued)

OTHER PUBLICATIONS

International Search Report and Written Opinion dated Apr. 13, 2022, directed to International Application No. PCT/US2022/070282; 12 pages.

(Continued)

*Primary Examiner* — Timothy D Collins
*Assistant Examiner* — Justin Michael Heston
(74) *Attorney, Agent, or Firm* — Finnegan, Henderson, Farabow, Garrett & Dunner, LLP

(57) ABSTRACT

An electric aircraft includes rotors for providing lift for vertical take-off and landing of the aircraft, proprotors that are tiltable between lift configurations for providing lift for vertical take-off and landing of the aircraft and propulsion configurations for providing forward thrust to the aircraft, a first battery pack for powering a first rotor and a first proprotor, a second battery pack for powering a second rotor and a second proprotor, a first electric power bus electrically connecting the first battery pack to the first rotor and proprotor, and a second electric power bus electrically connecting the second battery pack to the second rotor and proprotor, wherein the second electric power bus is electrically isolated from the first electric power bus.

35 Claims, 6 Drawing Sheets

(56) References Cited

U.S. PATENT DOCUMENTS

| | | |
|---|---|---|
| 8,129,951 B2 | 3/2012 | Turner et al. |
| 8,174,238 B2 | 5/2012 | Badger |
| 8,487,558 B2 | 7/2013 | Ogawa et al. |
| 8,552,686 B2 | 10/2013 | Jung et al. |
| 9,493,090 B2 | 11/2016 | Timmons et al. |
| 9,601,812 B2 | 3/2017 | Namou et al. |
| 9,616,766 B2 | 4/2017 | Fujii |
| 9,713,961 B2 | 7/2017 | Fan et al. |
| 9,783,037 B2 | 10/2017 | Muto et al. |
| 10,128,674 B2 | 11/2018 | Nelson |
| 10,179,519 B2 | 1/2019 | Schmidt |
| 2014/0330463 A1 | 11/2014 | Jeong |
| 2018/0134400 A1 | 5/2018 | Knapp et al. |
| 2018/0215465 A1 | 8/2018 | Renteria |
| 2018/0287398 A1 | 10/2018 | Melack et al. |
| 2018/0290746 A1 | 10/2018 | Hanna et al. |
| 2019/0092257 A1 | 3/2019 | Boecker et al. |
| 2019/0229541 A1 | 7/2019 | Ono |
| 2019/0255967 A1 | 8/2019 | Doersam et al. |
| 2019/0288521 A1 | 9/2019 | Wilhide et al. |
| 2020/0010187 A1 † | 1/2020 | Bevirt |
| 2020/0079520 A1 † | 3/2020 | Demizu |
| 2020/0164995 A1 | 5/2020 | Lovering et al. |
| 2020/0290742 A1 * | 9/2020 | Kumar .................. B64D 27/24 |
| 2021/0206499 A1 | 7/2021 | Balachandran et al. |
| 2021/0229821 A1 * | 7/2021 | Alt .......................... H02J 1/082 |
| 2022/0009626 A1 * | 1/2022 | Baharav .................. B64C 39/04 |
| 2022/0085459 A1 | 3/2022 | Demont et al. |
| 2022/0177145 A1 | 6/2022 | Melack |
| 2022/0234470 A1 | 7/2022 | Marius |

FOREIGN PATENT DOCUMENTS

| | | | |
|---|---|---|---|
| EP | 3624301 A1 | | 3/2020 |
| EP | 3645391 A1 | | 5/2020 |
| GB | 2569659 | † | 6/2019 |
| GB | 2569659 A | | 6/2019 |
| JP | 2010-183671 A1 | | 8/2010 |
| WO | 2012/133706 A1 | | 10/2012 |
| WO | 2015/138217 A1 | | 9/2015 |
| WO | 2016/189797 A1 | | 12/2016 |
| WO | 2019/006469 A1 | | 1/2019 |
| WO | 2019/041383 A1 | | 3/2019 |
| WO | 2019/145777 A1 | | 8/2019 |

OTHER PUBLICATIONS

International Search Report and Written Opinion dated Apr. 8, 2022, directed to International Application No. PCT/US2021/072776; 10 pages.

Marius, U.S. Office Action dated Jan. 26, 2022, directed to U.S. Appl. No. 17/156,047; 12 pages.

Bower et al., U.S. Appl. No. 16/878,380, filed May 19, 2020 for "Vertical Take-Off and Landing Aircraft."

International Search Report and Written Opinion dated Oct. 25, 2021, directed to International Application No. PCT/US2021/040619; 12 pages.

Marius, U.S. Appl. No. 17/156,047, filed Jan. 22, 2021 for "Systems and Methods for Power Distribution in Electric Aircraft."

Melack, U.S. Appl. No. 17/115,119, filed Dec. 8, 2020 for "Systems and Methods for Power Distribution in Electric Aircraft."

\* cited by examiner
† cited by third party

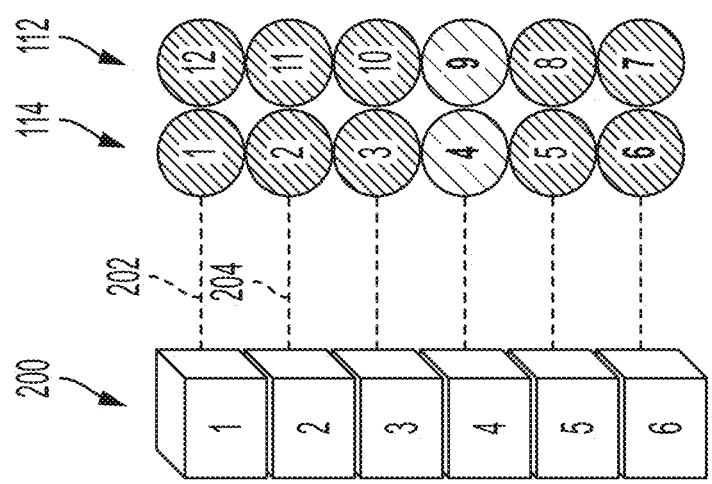

SYSTEMS AND METHODS FOR POWER DISTRIBUTION IN ELECTRIC AIRCRAFT

FIELD

The field of the present invention relates generally to electric aircraft, and more specifically to electric power distribution for electric aircraft.

BACKGROUND

Progress in battery technology has enabled battery power densities suitable for powering lightweight, electric aircraft. Electric power systems for electric aircraft, particularly passenger aircraft, must be safe while at the same time being both light and efficient. Safety considerations can sometimes be at odds with the goals of reduced weight and high efficiency. For example, conventional power distribution systems often employ multiple battery packs and redundancies within the power distribution system to ensure that there is no single point of failure but this redundancy increases inefficiencies and adds weight. Balancing safety and aircraft weight and efficiency concerns poses a challenge for designing electric aircraft.

SUMMARY

According to various embodiments, an electric aircraft includes a plurality of electric propulsion units and a plurality of battery packs that each independently powers a different portion of the electric propulsion units. According to various embodiments, a first set of the electric propulsion units is a set of rotors that provide lift to the aircraft and a second set of the electric propulsion units is a set of proprotors that is tiltable for providing lift in a lift position and forward thrust in a forward thrust position, and each battery pack powers at least a portion of at least one rotor and at least a portion of one proprotor. According to various embodiments, the first set of the electric propulsion units is positioned forward of the leading edge of a set of wings and the second set of the electric propulsion units is positioned rearward of the trailing edge of the set of wings such that each battery pack powers at least a portion of at least one of the electric propulsion units that are forward of the wings and at least a portion of at least one of the electric propulsion units that are rearward of the wings. Should a battery pack become disabled during flight, only the portion of the electric propulsion units that are powered by the battery pack are affected—the remaining electric propulsion units can operate normally because they are powered by the other battery packs. According to various embodiments, each battery pack powers at least a portion of at least one rotor and at least a portion of at least one proprotor so that in case the battery pack or its power distribution bus becomes disabled during forward flight, only the forward power from the at least a portion of at least one proprotor is lost, since the at least a portion of the at least one rotor is deactivated during forward flight and the remaining proprotor portions can continue operating with adjustment of control surfaces and power from the remaining proprotor portions compensating for the lost proprotor portions. According to various embodiments, the battery packs powering different portions of the electric propulsion units are not electrically connected with one another, which eliminates the need for diodes to prevent power flowing from one battery pack to another, resulting in greater electrical power distribution efficiency and weight savings relative to architectures in which battery packs are arranged in parallel.

According to some embodiments, an electric aircraft includes a plurality of rotors for providing lift for vertical take-off and landing of the aircraft; a plurality of proprotors that are tiltable between lift configurations for providing lift for vertical take-off and landing of the aircraft and propulsion configurations for providing forward thrust to the aircraft; a first battery pack for powering at least a portion of a first rotor of the plurality of rotors and at least a portion of a first proprotor of the plurality of proprotors; a second battery pack for powering at least a portion of a second rotor of the plurality of rotors and at least a portion of a second proprotor of the plurality of proprotors; a first electric power bus electrically connecting the first battery pack to the at least a portion of the first rotor and the at least a portion of the first proprotor; and a second electric power bus electrically connecting the second battery pack to the at least a portion of the second rotor and the at least a portion of the second proprotor, wherein the second electric power bus is electrically isolated from the first electric power bus.

In any of these embodiments, the first rotor and first proprotor can be on opposite sides of the aircraft.

In any of these embodiments, the first rotor can be powered by only the first battery pack and the first proprotor is powered by only the second battery pack.

In any of these embodiments, the first rotor can include at least two motor portions, the first battery pack powers a first motor portion of the at least two motor portions, and the second battery pack powers a second motor portion of the at least two motor portions.

In any of these embodiments, an electric circuit connecting the first battery pack to the first rotor and to the first proprotor can be free of diodes.

In any of these embodiments, the first battery pack can include a plurality of batteries arranges in series, parallel, or a combination of series and parallel.

In any of these embodiments, the first and second battery packs can be configured to generate greater than 100 volts.

In any of these embodiments, an electric power of at least one of the first rotor and the first proprotor can be at least 10 kilowatts.

In any of these embodiments, the aircraft can be manned.

In any of these embodiments, the aircraft can be a vertical take-off and landing aircraft.

According to some embodiments, a method for powering an aircraft includes powering, by a first battery pack, at least a portion of a first rotor and at least a portion of a first proprotor via a first electric power bus electrically connecting the first battery pack to the at least a portion of the first rotor and the at least a portion of the first proprotor; and powering, by a second battery pack, at least a portion of a second rotor and at least a portion of a second proprotor via a second electric power bus electrically connecting the second battery pack to the at least a portion of the second rotor and the at least a portion of the second proprotor, wherein the second electric power bus is electrically isolated from the first electric power bus.

In any of these embodiments, the first rotor and first proprotor can be on opposite sides of the aircraft.

In any of these embodiments, the method can further include providing lift to the aircraft during vertical take-off via the first and second rotors and the first and second proprotors and providing forward thrust to the aircraft during cruising via the first and second proprotors while the first and second rotors are deactivated.

In any of these embodiments, the first rotor can be powered by only the first battery pack.

In any of these embodiments, the first rotor can include at least two motor portions, the first battery pack powers a first motor portion of the at least two motor portions, and the second battery pack powers a second motor portion of the at least two motor portions.

In any of these embodiments, an electric circuit connecting the first battery pack to the first rotor and the first proprotor can be free of diodes.

In any of these embodiments, the first battery pack can include a plurality of batteries arranges in series, parallel, or a combination of series and parallel.

In any of these embodiments, the first and second battery packs can be configured to generate greater than 100 volts.

In any of these embodiments, an electric power of the first rotor can be at least 10 kilowatts.

In any of these embodiments, the aircraft can be manned.

According to various embodiments, an electric aircraft includes a fuselage; at least one wing connected to the fuselage; a first plurality of electric propulsion units mounted to the at least one wing and positioned at least partially forward of a leading edge of the at least one wing; a second plurality of electric propulsion units mounted to the at least one wing and positioned at least partially rearward of a trailing edge of the at least one wing; a first battery pack for powering at least a portion of a first electric propulsion unit of the first plurality of electric propulsion units and at least a portion of a first electric propulsion unit of the second plurality of electric propulsion units; a second battery pack for powering at least a portion of a second electric propulsion unit of the first plurality of electric propulsion units and at least a portion of a second electric propulsion unit of the second plurality of electric propulsion units; a first electric power bus electrically connecting the first battery pack to the at least a portion of the first electric propulsion unit of the first plurality of electric propulsion units and the at least a portion of the first electric propulsion unit of the second plurality of electric propulsion units; and a second electric power bus electrically connecting the second battery pack to the at least a portion of the second electric propulsion unit of the first plurality of electric propulsion units and the at least a portion of the second electric propulsion unit of the second plurality of electric propulsion units, wherein the second electric power bus is electrically isolated from the first electric power bus.

In any of these embodiments, the first electric propulsion unit of the first plurality of electric propulsion units and the first electric propulsion unit of the second plurality of electric propulsion units can be on opposite sides of the aircraft.

In any of these embodiments, the first plurality of electric propulsion units can include tiltable proprotors and the second plurality of electric propulsion units can include fixed rotors.

In any of these embodiments, the first electric propulsion unit of the first plurality of electric propulsion units can be powered by only the first battery pack.

In any of these embodiments, the first electrical propulsion unit of the first plurality of electric propulsion units can include at least two motor portions, the first battery pack powers a first motor portion of the at least two motor portions, and the second battery pack powers a second motor portion of the at least two motor portions.

In any of these embodiments, an electric circuit connecting the first battery pack to the first electric propulsion unit of the first plurality of electric propulsion units and the first electric propulsion unit of the second plurality of electric propulsion units can be free of diodes.

In any of these embodiments, the first battery pack can include a plurality of batteries arranges in series, parallel, or a combination of series and parallel.

In any of these embodiments, the first and second battery packs can be configured to generate greater than 100 volts.

In any of these embodiments, an electric power of the first electric propulsion unit of the first plurality of electric propulsion units can be at least 10 kilowatts.

In any of these embodiments, the aircraft can be manned.

In any of these embodiments, the aircraft can be a vertical take-off and landing aircraft.

According to some embodiments, a method for powering an aircraft includes powering, by a first battery pack, a first plurality of electric propulsion units mounted to at least one wing of the aircraft and positioned at least partially forward of a leading edge of the at least one wing via a first electric power bus electrically connecting the first battery pack to the at least a portion of the first electric propulsion unit of the first plurality of electric propulsion units and the at least a portion of the first electric propulsion unit of the second plurality of electric propulsion units; and powering, by a second battery pack, a second plurality of electric propulsion units mounted to the at least one wing and positioned at least partially rearward of a trailing edge of the at least one wing via a second electric power bus electrically connecting the second battery pack to the at least a portion of the second electric propulsion unit of the first plurality of electric propulsion units and the at least a portion of the second electric propulsion unit of the second plurality of electric propulsion units, wherein the second electric power bus is electrically isolated from the first electric power bus.

In any of these embodiments, the first electric propulsion unit of the first plurality of electric propulsion units and the first electric propulsion unit of the second plurality of electric propulsion units can be on opposite sides of the aircraft.

In any of these embodiments, the first plurality of electric propulsion units includes tiltable proprotors and the second plurality of electric propulsion units includes fixed rotors.

In any of these embodiments, the first electric propulsion unit of the first plurality of electric propulsion units can be powered by only the first battery pack.

In any of these embodiments, the first electrical propulsion unit of the first plurality of electric propulsion units can include at least two motor portions, the first battery pack powers a first motor portion of the at least two motor portions, and the second battery pack powers a second motor portion of the at least two motor portions.

In any of these embodiments, an electric circuit connecting the first battery pack to the first electric propulsion unit of the first plurality of electric propulsion units and the first electric propulsion unit of the second plurality of electric propulsion units can be free of diodes.

In any of these embodiments, the first battery pack can include a plurality of batteries arranges in series, parallel, or a combination of series and parallel.

In any of these embodiments, the first and second battery packs can be configured to generate greater than 100 volts.

In any of these embodiments, an electric power of the first electric propulsion unit of the first plurality of electric propulsion units can be at least 10 kilowatts.

In any of these embodiments, the aircraft can be manned.

In any of these embodiments, the aircraft can be a vertical take-off and landing aircraft.

BRIEF DESCRIPTION OF THE DRAWINGS

The invention will now be described, by way of example only, with reference to the accompanying drawings, in which:

FIGS. 2A and 2B illustrate a power distribution architecture for powering the electric propulsion units of an aircraft, according to various embodiments;

DETAILED DESCRIPTION

Figure 1A:
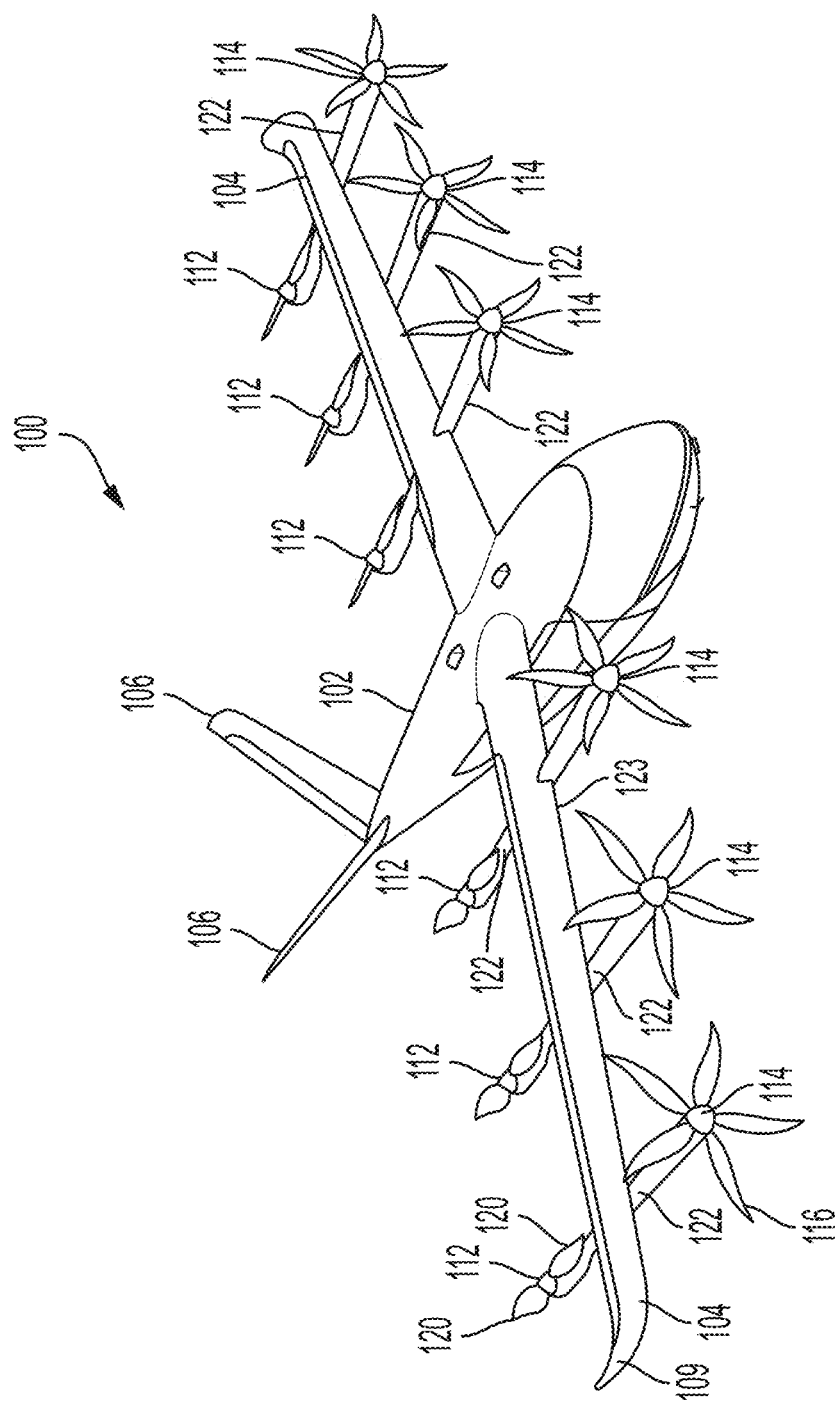
FIG. 1A shows a VTOL aircraft in a forward flight configuration, according to various embodiments.

According to various embodiments, systems and methods for power distribution in an electric aircraft include powering a plurality of electric propulsion units (EPUs) of the aircraft with a plurality of battery packs that each power a different portion of the EPUs using different power distribution buses. For example, a first battery pack powers a first portion the EPUs using a first power distribution bus and a second battery pack powers a second portion of the EPUs using a second power distribution bus that is electrically isolated from the first power distribution bus. Should the first battery pack fail, only the first portion of EPUs are without power—the second portion of EPUs continue to be provided with power from the second battery pack. The EPUs are sized such that the aircraft can continue controlled flight without at least the first portion of the EPUs. By powering different portions of the EPUs with different battery packs using different buses, fault tolerant power distribution can be achieved without requiring interconnected battery packs and the diodes such architectures require, which can result in greater power distribution efficiency and lower weight.

According to various embodiments, the plurality of EPUs include rotors that are configured for providing lift to the aircraft, such as during vertical take-off and landing and during hover, and can be deactivated during cruise, and proprotors that can provide lift to the aircraft and tilt forward to provide forward thrust to the aircraft for forward flight, with lift being provided by one or more wings of the aircraft. According to various embodiments, each battery pack powers at least a portion of at least one rotor and at least a portion of at least one proprotor so that in case the battery pack or its power distribution bus becomes disabled during forward flight, only the power from the at least a portion of at least one proprotor is lost. The other EPU(s) powered by the lost battery pack—the rotor(s)—don't contribute to the forward power, so their loss does not affect the forward flight. The remaining proprotor portions (those powered by other battery packs) can continue operating, with adjustment of control surfaces and/or adjustment of power from the remaining proprotor portions compensating for the lost proprotor portions. Thus, effects of the loss of a battery pack to forward flight can be minimized while still providing fault tolerance without increased weight associated with diodes and/or redundant power distribution buses. According to various embodiments, each battery pack powers the equivalent of one proprotor (in addition to some proportion of the rotors) such that the forward power loss for forward flight resulting from the loss of a battery pack is only the equivalent of the power from one proprotor.

According to various embodiments, the aircraft is an electric vertical take-off and landing (VTOL or eVTOL) aircraft, which can take-off and land vertically and hover, providing the ability to carry travelers closer to their destination than would be the case when using aircraft that require a runway. According to various embodiments, the aircraft is a fixed wing eVTOL.

According to various embodiments, the EPUs that are driven by a given battery pack are selected to reduce destabilization effects caused by a loss of power to the EPUs should the battery pack fail. EPUs that are arranged on opposite sides of one or more axes of symmetry of the collection of EPUs can be powered by the same battery pack to reduce the roll, pitch, or yaw moments that may be caused by the loss of power to the EPUs driven by the battery pack. For example, EPUs in the same relative position on either side of the longitudinal axis of the aircraft may be driven by a first battery pack so that, should one of the battery packs fail, minimal roll moments will occur because the thrust provided by the remaining EPUs will still be uniform about the longitudinal axis. Similarly, in some embodiments, EPUs are arranged forward and rearward of a set of wings and EPUs on opposite sides of the wings and opposite sides of the longitudinal axis may be powered by the same battery pack.

According to various embodiments, the portion of EPUs powered by a battery pack can include a portions of a single EPU motor such that one portion of an EPU motor is powered by a first battery pack and another portion of the EPU motor is powered by a second battery pack. For example, an EPU may include two half-motors that can work in unison during normal operation to drive a plurality of blades for providing thrust to the aircraft and one of the half-motors is driven by one battery pack and the other half-motor is driven by another battery pack. In the event of a failure of one of the battery packs, the EPU is still operational at half power. A given battery pack can power partial-motors of different EPUs do that the effects of the loss of a battery pack are shared across multiple EPUs that continue to operate at reduced power.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a," "an," and "the" used in the following description are intended to include the plural forms as well, unless the context clearly indicates otherwise. It is also to be understood that the term "and/or"," as used herein, refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

As used herein, the term "proprotor" refers to a variable pitch propeller that can provide thrust for vertical lift and for forward propulsion by varying the pitch of the propeller.

As used herein, the term "battery pack" means any combination of electrically connected batteries (i.e., battery cells) and can include a plurality of batteries arranges in series, parallel, or a combination of series and parallel.

Figure 1B:
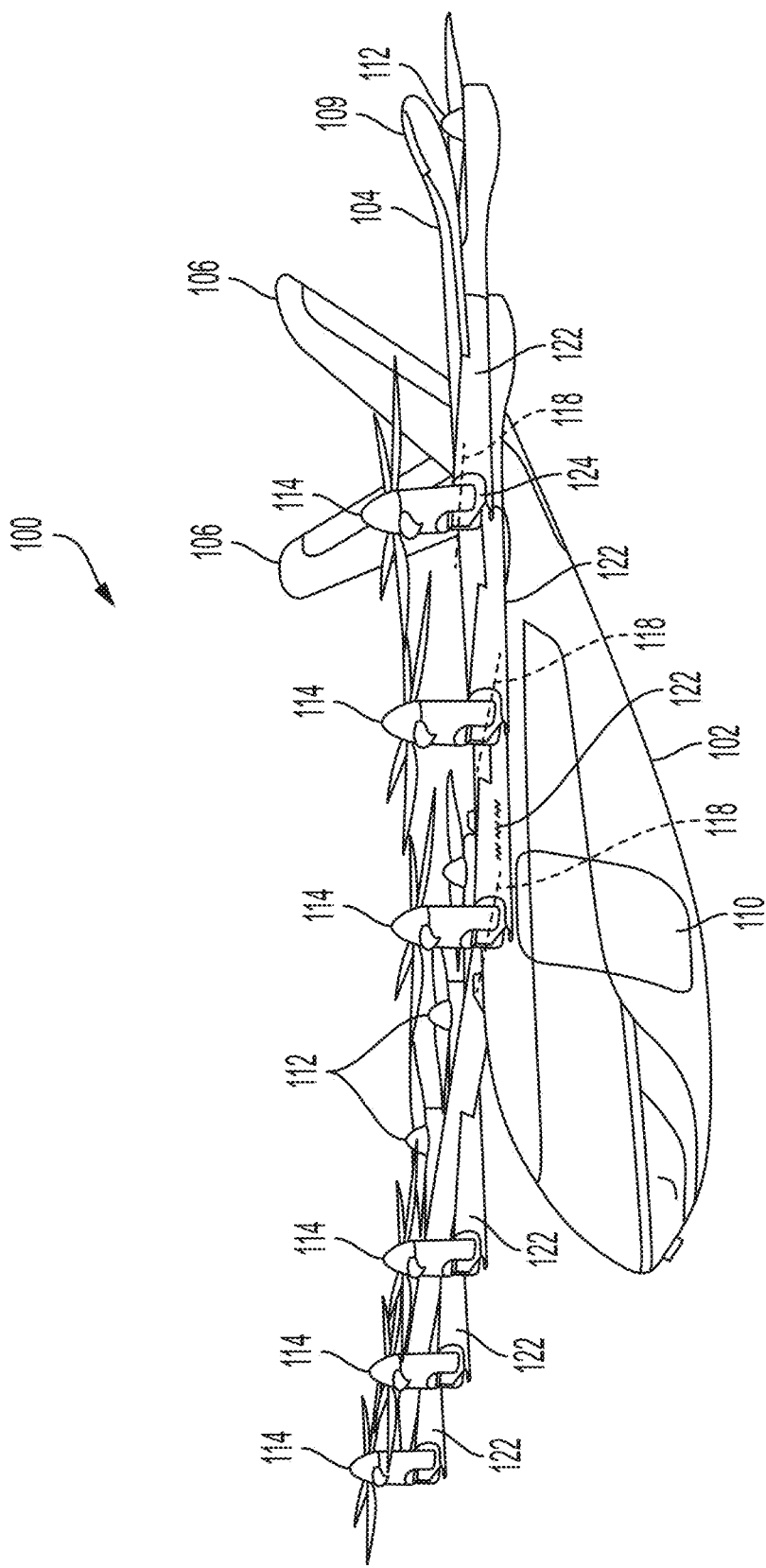
FIG. 1B shows a VTOL aircraft in a takeoff and landing configuration, according to various embodiments.

FIGS. 1A and 1B illustrate a VTOL aircraft 100 in a cruise configuration and a vertical take-off and landing configuration, respectively, according to various embodiments. Exemplary embodiments of a VTOL aircraft according to various embodiments are discussed in U.S. patent application Ser. No. 16/878,380, titled "Vertical Take-Off and Landing Aircraft" and filed May 19, 2020, the entire contents of which are incorporated herein by reference.

The aircraft 100 includes a fuselage 102, wings 104 mounted to the fuselage 102, and one or more rear stabilizers 106 mounted to the rear of the fuselage 102. The aircraft 100 includes a plurality rotors 112 and a plurality of proprotors 114 (collectively referred to herein as EPUs). The EPUs (112, 114) generally include an electric motor driving a fan (a plurality of blades) and a motor controller for controlling/powering the motor. As discussed further below with respect to FIG. 4, an EPU can include a plurality of partial motors that can independently and together drive the fan and can be controlled by a plurality of separate motor controllers.

Rotors 112 are mounted to the wings 104 and are configured to provide lift for vertical take-off and landing. Proprotors 114 are mounted to the wings 104 and are tiltable between lift configurations in which they provide a portion of the lift required for vertical take-off and landing and hovering, as shown in FIG. 1B, and propulsion configurations in which they provide forward thrust to the aircraft 100 for horizontal flight, as shown in FIG. 1A. As used herein, a proprotor lift configuration refers to any proprotor orientation in which the proprotor thrust is providing primarily lift to the aircraft and a proprotor propulsion configuration refers to any proprotor orientation in which the proprotor thrust is providing primarily forward thrust to the aircraft.

According to various embodiments, the rotors 112 are configured for providing lift only, with all propulsion being provided by the proprotors. Accordingly, the rotors 112 may be in fixed positions. During take-off and landing, the proprotors 114 are tilted to lift configurations in which their thrust is directed downwardly for providing additional lift.

For forward flight, the proprotors 114 tilt from their lift configurations to their propulsion configurations. In other words, the pitch of the proprotors 114 is varied from a pitch in which the proprotor thrust is directed downward to provide lift during vertical take-off and landing and during hover to a pitch in which the proprotor thrust is directed rearward to provide forward thrust to the aircraft 100. The proprotors tilt about axes 118 that are perpendicular to the forward direction of the aircraft 100. When the aircraft 100 is in full forward flight, lift may be provided entirely by the wings 104, and the rotors 112 may be shut-off. The blades 120 of the rotors 112 may be locked in low drags positions for aircraft cruising. In some embodiments, the rotors 112 each have two blades 120 that are locked for cruising in minimum drag positions in which one blade is directly in front of the other blade as illustrated in FIG. 1A. In some embodiments, the rotors 112 have more than two blades. In some embodiments, the proprotors 114 include more blades 116 than the rotors 112. For example, as illustrated in FIGS. 1A and 1B, the rotors 112 may each include two blades and the proprotors 114 may each include five blades. According to various embodiments, the proprotors 114 can have from 2 to 5 blades.

According to various embodiments, the aircraft includes only one wing 104 on each side of the fuselage 102 (or a single wing that extends across the entire aircraft) and at least a portion of the rotors 112 are located rearward of the wings 104 and at least a portion of the proprotors 114 are located forward of the wings 104. In some embodiments, all of the rotors 112 are located rearward of the wings 104 and all of the proprotors are located forward of the wings 104. According to some embodiments, all rotors 112 and proprotors 114 are mounted to the wings—i.e., no rotors or proprotors are mounted to the fuselage. According to various embodiments, the rotors 112 are all located rearwardly of the wings 104 and the proprotors 114 are all located forward of the wings 104. According to some embodiments, all rotors 112 and proprotors 114 are positioned inwardly of the wing tips 109.

According to various embodiments, the rotors 112 and proprotors 114 are mounted to the wings 104 by booms 122. The booms 122 may be mounted beneath the wings 104, on top of the wings, and/or may be integrated into the wing profile. According to various embodiments, one rotor 112 and one proprotor 114 are mounted to each boom 122. The rotor 112 may be mounted at a rear end of the boom 122 and a proprotor 114 may be mounted at a front end of the boom 122. In some embodiments, the rotor 112 is mounted in a fixed position on the boom 122. In some embodiments, the proprotor 114 is mounted to a front end of the boom 122 via a hinge 124. The proprotor 114 may be mounted to the boom 122 such that the proprotor 114 is aligned with the body of the boom 122 when in its propulsion configuration, forming a continuous extension of the front end of the boom 122 that minimizes drag for forward flight.

According to various embodiments, the aircraft 100 may include only one wing on each side of the aircraft 100 or a single wing that extends across the aircraft. According to some embodiments, the at least one wing 104 is a high wing mounted to an upper side of the fuselage 102. According to some embodiments, the wings include control surfaces, such as flaps and/or ailerons. According to some embodiments, the wings can have curved wing tips 109 for reduced drag during forward flight.

According to some embodiments, the rear stabilizers 106 include control surfaces, such as one or more rudders, one or more elevators, and/or one or more combined rudder-elevators. The wing(s) may have any suitable design. In some embodiments, the wings have a tapering leading edge 123, as shown for example, in the embodiment of FIG. 1A. In some embodiments, the wings have a tapering trailing edge.

Figure 2A:
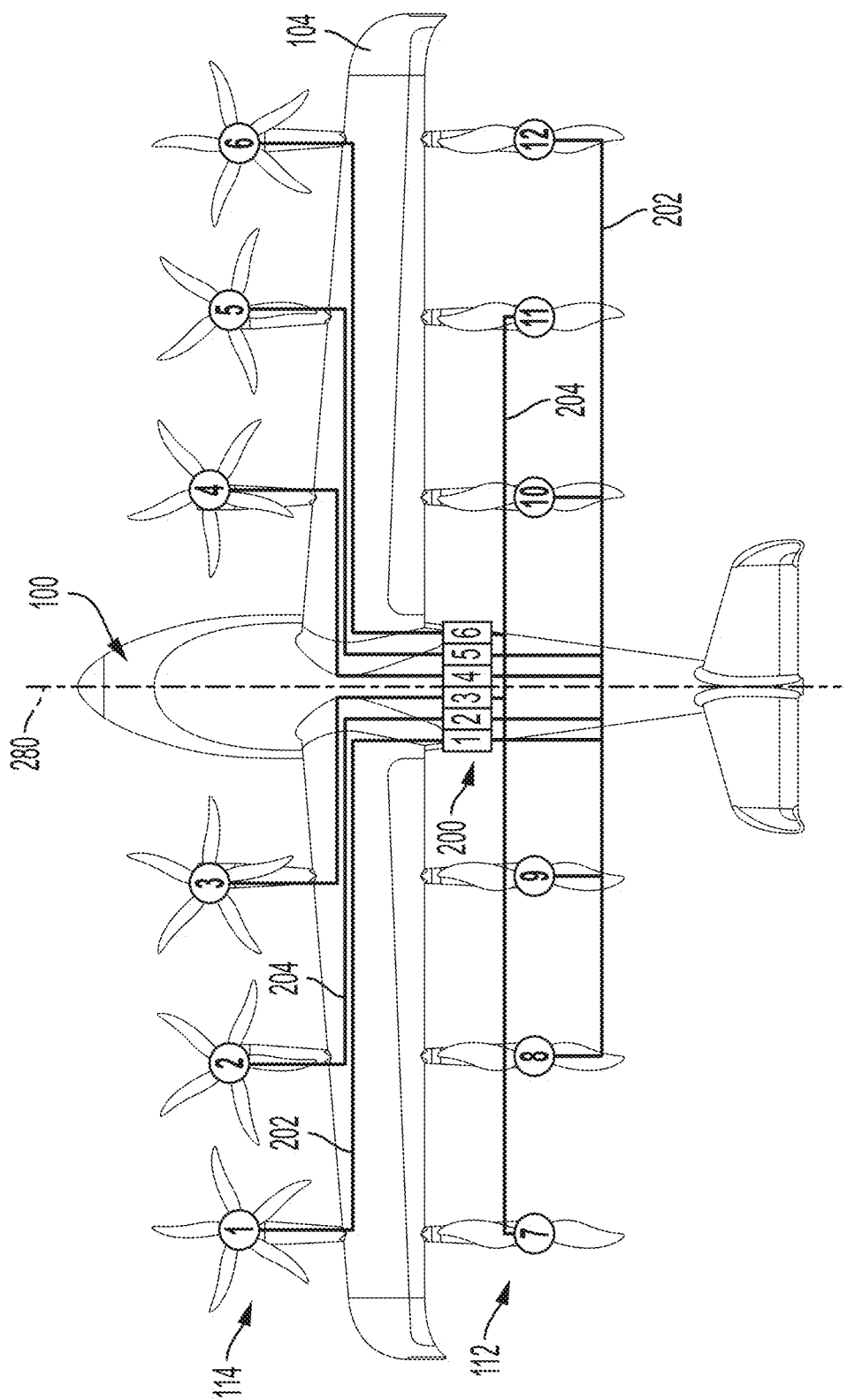

FIG. 2A illustrates a power distribution architecture for powering the EPUs (112, 114) of aircraft 100, according to various embodiments. Although FIGS. 1A-2A illustrate 12 EPUS (numbered 1-12 in FIG. 2A) mounted to wings 104 aircraft according to various embodiments can have any suitable number of EPUs, including four, six, eight, ten, fourteen, eighteen, twenty, or more. The EPUs are powered by a plurality of battery packs 200. In the embodiment illustrated in FIG. 2A, there are six battery packs 200—numbered 1 through 6. Each battery pack 200 powers only a portion of the EPUs. In the illustrated embodiment, each battery pack 200 powers two EPUs. The groupings of battery packs and EPUs according to the embodiment illustrated in FIG. 2A is listed in FIG. 2B. Battery pack 1 powers EPUs 1 and 12, battery pack 2 powers EPUs 2 and 11, and so on. Each battery pack 200 is connected to its respective portion of the EPUs via a dedicated power distribution bus—e.g., buses 202, 204. So, the power distribution bus 202 of one battery pack 1 is not electrically connected to the power distribution bus 204 of battery pack 2.

Since the battery pack 200 are electrically isolated from one another, an electrical failure in one battery pack or its power distribution does not affect the operation of the other EPUs and battery packs. Only the EPUs powered by the failed battery pack or power distribution are affected. Thus, there is no single point of failure in the powering of the aircraft. Further, since the battery packs and power distribution circuitry are isolated from one another, there is no need for diodes to prevent current from flowing from one battery pack to another. This can results in significant weight savings and increased efficiency relative to systems that have battery packs in parallel.

According to various embodiments, the particular EPUs that are powered by a given battery pack may be selected to reduce the destabilization effects caused by a loss of power to the EPUs should the battery pack fail. According to various embodiments, EPUs that are arranged on opposite sides of one or more axes of symmetry of the collection of EPUs can be powered by the same battery pack to reduce the roll, pitch, or yaw moments that may be caused by the loss of power to the EPUs driven by the battery pack. For example, EPUs in the same relative position on either side of the longitudinal axis 280 of the aircraft may be driven by a first battery pack so that, should one of the battery packs fail, minimal roll moments will occur because the thrust provided by the remaining EPUs will remain uniform about the longitudinal axis. Similarly, in some embodiments, a set of EPUs are arranged at least partially forward of the leading edge of a pair of wings and a set if EPUs are arranged at least partially rearward of the trailing edge of the pair of wings, and EPUs on opposite sides of the wings and opposite sides of the longitudinal axis 280 may be powered by the same battery pack so that minimal roll and pitch moments will occur in the event the battery pack fails (such as shown in FIG. 2A).

According to various embodiments, each battery pack 200 powers at least a portion of at least one proprotor 114 and at least a portion of at least one rotor 112. In the embodiment of FIG. 2A, rotors and proprotors at opposite positions are driven by the same battery pack 200. So, the outboard-most proprotor 114 on the left side of the fuselage 102 of the aircraft (EPU 1 in FIG. 2A) is powered by the same battery pack (battery pack 1 in FIG. 2A) as the outboard-most rotor 112 on the right side of the fuselage 102 (EPU 12). Similarly, the other pair of outboard-most EPUs (EPU 6 and EPU 7 in FIG. 2A) are powered by the same battery pack (battery pack 6). Groupings need not be limited to EPUs at exact opposite positions. For example, EPU 1 may be grouped with EPU 11 instead of EPU 12.

The number of EPUs powered by a given battery pack can be greater than two. For example, in some embodiments, the number of EPUs per battery pack can be three, four, five, six, or any other suitable portion of total number of EPUs. According to various embodiments, there can be different numbers of EPUs within each group. For example, one group can have two EPUs (two EPUs driven by a battery pack) while another group can have four EPUs (four EPUs driven by a different battery pack). The number of battery packs can be as few as two. In various embodiments, the number of battery packs is at least three, at least four, at least five, at least six, at least seven, at least eight, or higher.

Figure 3:
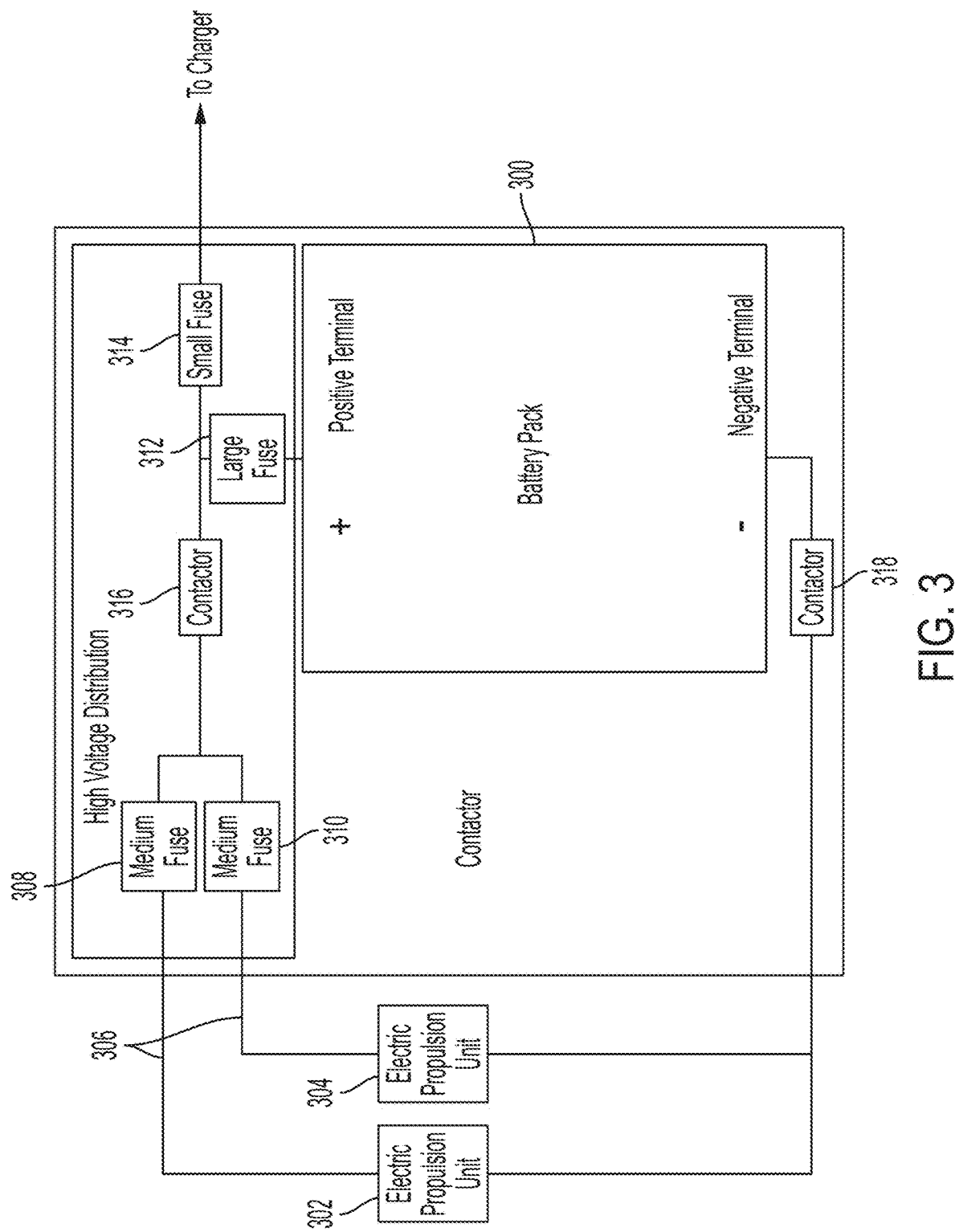
FIG. 3 is a block diagram of circuitry connecting one battery pack to a pair of electric propulsion units, according to various embodiments.

FIG. 3 is a block diagram of circuitry connecting one battery pack 300 to a pair of EPUs 302, 304, according to various embodiments. EPU 302 can be, for example, EPU 1 of FIG. 2A and EPU 304 can be, for example, EPU 12 of FIG. 2A. The battery pack 300 is connected to the EPUs 302, 304 via a power distribution bus 306. A plurality of fuses are provided to protect the components in the event of an electrical fault. Two fuses 308 and 310 are provided to disconnect EPU 302 and 304, respectively, should a power surge associated with the respective EPU 302, 304 occur. A fuse 312 is positioned immediately downstream of the battery pack 300. Fuse 312 has a higher amperage rating than fuses 308, 310 since it handles the power for both of the EPUs. According to various embodiments, a small fuse 314 is located between the battery pack and the charging circuit (not shown).

According to various embodiments, a contactor 316 may be provided for connecting/disconnecting the positive terminal of the battery pack 300 to/from the EPUs. According to various embodiments, the contactor 316 can be used to disconnect the EPUs from power, such as while the aircraft is on the ground. According to various embodiments, the contactor 316 is manually operated, such as via a manual switch located in the cockpit of the aircraft. In some embodiments, a similar contactor 318 is provided on the negative terminal as well.

Figure 4:
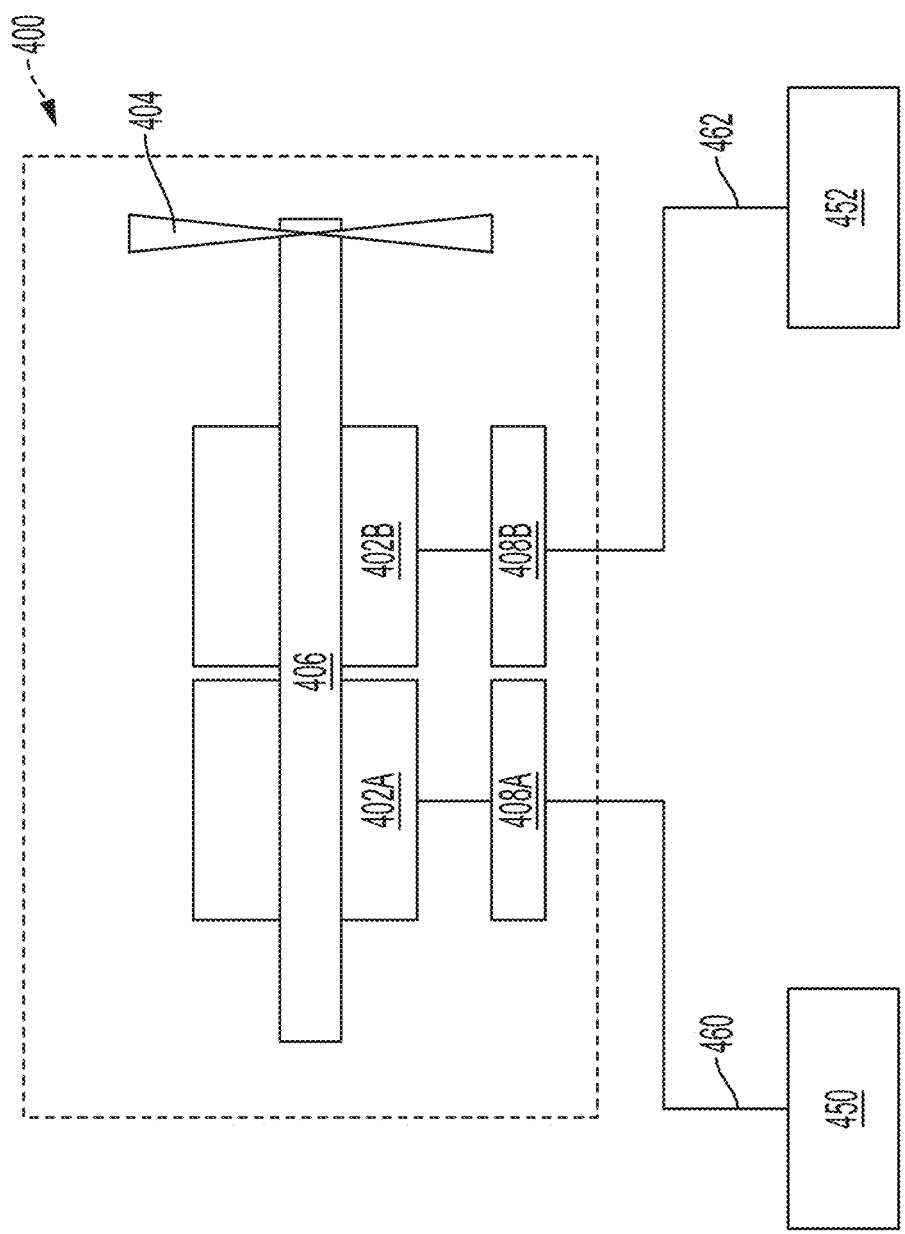
FIG. 4 is a block diagram of a portion of the power distribution to an electric propulsion unit that includes two partial motors, according to various embodiments.

In some embodiments, the EPUs or at least some of the EPUs include multiple motor stages that are each independently powered by different battery packs so that should one battery pack fail only a portion of the EPU is unpowered and the EPU can continue operating at a reduced power level. FIG. 4 is a block diagram of a portion of the power distribution to an EPU 400 that includes two partial motors- 402A and 402B. The EPU 400 can be a rotor, such as rotor 112 of FIG. 1A, or a proprotor, such as proprotor 114 of FIG. 1A. The two partial motors 402A and 402B can operate independently to drive fan blades 404 via shaft 406 and can operate simultaneously to drive the fan blades 404 at higher power. The partial motors 402A and 402B are driven by their own motor controllers 408A and 408B, respectively. Partial motor 402A and motor controller 408A are powered by battery pack 450 via power distribution bus 460, while partial motor 402B and motor controller 408B are powered by battery pack 452 via power distribution bus 462. The partial motor 402A, motor controller 408A, distribution bus 460, and battery pack 450 are electrically isolated from partial motor 402B, motor controller 408B, distribution bus 462, and battery pack 452. Therefore, an electrical fault affecting the first partial motor 402A does not affect the second partial motor 402B and vice versa. Thus, the EPU 400 can continue to operate, albeit at reduced power, in the event that one of the battery packs 450 or 452 should fail.

According to various embodiments, a battery pack can drive partial motors of oppositely arranged EPUs. For example, looking at FIG. 2A, first battery pack 1 can power a first partial motor of EPU 1, a first partial motor of EPU 12, a first partial motor of EPU 6, and a first partial motor of EPU 7. Thus, in the event of a failure of battery pack 1, both the rotors and proprotors at the same relative position on the opposite sides of the airplane will lose at least half of their maximum available power but will still be operational.

The battery packs for powering the EPUs can be located in any suitable locations of the aircraft, including in the fuselage and/or the wings. The number and power of the EPUs can be selected according to the desired performance parameters (e.g., target payload, airspeed, and altitude). According to various embodiments, the maximum power rating of one or more of the EPUs is 500 kilowatts or less, preferably 200 kilowatts or less, more preferably 150 kilowatts or less. According to some embodiments, the maximum power rating of one or more of the EPUs is at least 10 kilowatts, preferably at least 20 kilowatts, more preferably, at least 50 kilowatts. The aircraft can have an equal number of rotors and proprotors, a greater number of proprotors, or a greater number of rotors.

According to various embodiments, each battery pack is configured for a maximum stored energy of at least 1 kilowatt-hour or preferably at least 10 kilowatt-hours, and/or a maximum stored energy of at most 200 kilowatt-hours, preferably at most 100 kilowatt-hours, preferably at most 75 kilowatt-hours, more preferably at most 50 kilowatt-hours. According to various embodiments, the battery packs are configured so that their collective maximum stored energy is at least 1 kilowatt-hour or preferably at least 10 kilowatt-hours, and/or their maximum stored energy is at most 200 kilowatt-hours, preferably at most 100 kilowatt-hours, preferably at most 75 kilowatt-hours, or more preferably at most 50 kilowatt-hours. According to various embodiments, at least some of the battery packs at full charge provide a voltage of at least 100 volts, at least 500 volts, or at least 1000 volts. According to various embodiments, at least some of the battery packs at full charge provide at most 2000 volts, at most 1500 volts, at most 1000 volts, or at most 500 volts. According to some embodiments, nominal maximum voltage is between 500 and 1000 volts, preferably between 600 and 800 volts, or more preferably between 650 and 750 volts.

According to various embodiments, the EPUs are sized to accommodate a loss of a portion of the EPUs due to a battery pack failure in accordance with the principles discussed above. For example, should two EPUs be lost due to a failure in the battery pack driving the two EPUs, the remaining EPUs and the associated battery packs may be sufficiently sized to provide additional thrust to at least partially make up for the thrust lost from the disabled EPUs.

Aircraft according to the principles discussed above can be configured to carry at least one person and up to 10 people, preferably up to 6 people, and more preferably up to 4 people. According to some embodiments, the aircraft is configured to be piloted and includes piloting controls. In some embodiments, the aircraft is configured to operate autonomously without any onboard pilot and with or without one or more passengers.

According to some embodiments, the aircraft is configured to carry up to 6 people (for example, a pilot and up to 5 passengers) up to 75 miles at a cruising speed of up to 150 miles per hour at an altitude of up to 3,000 feet above ground. In some embodiments, the aircraft is configured for 5 people, such as one pilot and four passengers. According to various embodiments, the maximum range on a single battery charge is 25 miles, 50 miles, 75 miles, 100 miles, or 200 miles.

According to various embodiments, the rotors 112 and/or proprotors 114 are configured to have relatively low tip speed to decrease the amount of noise generated by the aircraft. In some embodiments, the tip speed of the rotor blades is about 0.4 Mach in hover. According to various embodiments, the diameter of the rotor and/or proprotor blades is the range of 1 to 5 meters, preferably in the range of 1.5 to 2 meters.

According to various embodiments, the wingspan is in the range of 10 to 20 meters, preferably in the range of 15 to 16 meters. According to various embodiments, the length of the aircraft is in the range of 3 to 20 meters, preferably in the range of 5 to 15 meters, more preferably in the range of 6 to 10 meters.

According to various embodiments, the aircraft is operated during take-off and landing by positioning the proprotors in lift configurations and providing the required lift to the aircraft via the combined lift provided by the rotors and proprotors. According to various embodiments, during vertical take-off and landing and/or hover, the proprotors can be maintained in predetermined lift configurations that can be the same across all proprotors or different for different proprotors. According to various embodiments, the tilt of at least some of the proprotors can be actively adjusted during take-off and landing and/or hover to provide the required stability and/or maneuvering. According to some embodiments, the tilt of at least one proprotor is actively controlled by the flight controller during take-off, landing, and/or hover to generate yawing moments.

According to various embodiments, each rotor and/or each proprotor can be individually controlled by the flight controller according to the various operational degrees of freedom. According to various embodiments, the only degree of freedom of the rotor is the rotational speed of the rotor. In some embodiments, the angle of attack of the blades of the rotors can be collectively adjusted, providing an additional degree of freedom. According to various embodiments, the degrees of freedom of at least a portion of the proprotors includes the rotational speed of the proprotors, the collective attack angle of the blades, and the degree of tilt of the proprotors. According to various embodiments, any of these degrees of freedom can be actively controlled by the flight controller (either autonomously or in response to pilot commands) during take-off and landing in order to provide the appropriate stability and maneuvering.

Once the aircraft has achieved sufficient altitude to commence forward flight, the proprotors begin tilting forward toward their propulsion configurations such that their thrust provides a combination of lift and thrust, with a decreasing proportion of lift as the proprotors are tilted further toward their propulsion configurations. The rotors can remain active during at least a portion of the period in which the proprotors are tilted forward to continue to provide rotor-based lift. At any point after the forward airspeed is high enough that the wings provides sufficient lift to maintain the aircraft's altitude, the rotors can be deactivated. As discussed above, the rotor blades can be locked in a low-drag position.

During cruising, the rotors remain deactivated. The control surfaces of the wings and/or rear stabilizers can be used for aircraft maneuvering and stability in a conventional manner. According to some embodiments, should a battery pack be lost during forward flight, resulting in the loss of the power provided by the portion of the proprotors powered by the lost battery pack, the aircraft can compensate via use of the control surfaces and/or via adjustment in power from the unaffected portion of the proprotors.

According to some embodiments, the tilt of at least some of the proprotors can be actively controlled to provide additional stability and/or maneuverability control. In some embodiments, the tilt of at least some of the proprotors is actively controlled during take-off and landing and/or hover. In some embodiments, the tilt of the proprotors is fixed (i.e., non-varying) during cruise. According to some embodiments, the tilt of the outermost proprotors can be actively and independently controlled during vertical take-off and landing and/or hover to provide yawing moments as needed.

According to various embodiments, the EPUs (rotors and proprotors) can be powered according to the power distribution architecture described herein. For example, a method for powering an aircraft includes powering, by a first battery pack, a first plurality of electric propulsion units mounted to at least one wing of the aircraft and positioned at least partially forward of a leading edge of the at least one wing via a first electric power bus electrically connecting the first battery pack to the at least a portion of the first electric propulsion unit of the first plurality of electric propulsion units and the at least a portion of the first electric propulsion unit of the second plurality of electric propulsion units. The method also includes powering, by a second battery pack, a second plurality of electric propulsion units mounted to the at least one wing and positioned at least partially rearward of a trailing edge of the at least one wing via a second electric power bus electrically connecting the second battery pack to the at least a portion of the second electric propulsion unit of the first plurality of electric propulsion units and the at least a portion of the second electric propulsion unit of the second plurality of electric propulsion units, wherein the second electric power bus is electrically isolated from the first electric power bus.

According to various embodiments, a method for powering an aircraft includes powering, by a first battery pack, at least a portion of a first rotor and at least a portion of a first proprotor via a first electric power bus electrically connecting the first battery pack to the at least a portion of the first rotor and the at least a portion of the first proprotor. The method also includes powering, by a second battery pack, at least a portion of a second rotor and at least a portion of a second proprotor via a second electric power bus electrically connecting the second battery pack to the at least a portion of the second rotor and the at least a portion of the second proprotor, wherein the second electric power bus is electrically isolated from the first electric power bus.

According to various embodiments, should a battery pack or power distribution for that battery pack fail during flight—such as during vertical take-off or landing, hover, or forward flight—only the EPUs powered by that battery pack are disabled. The remaining EPUs—those powered by other battery packs that are electrically isolated from the disabled battery pack—continue to operate. According to various embodiments, the power of at least a portion of the unaffected EPUs may be increased to compensate for the loss of the thrust of the disabled EPUs.

According to various embodiments, the battery packs power different motor portions of the same EPU such that in the event of loss of one of the battery packs or its power distribution the affected EPUs can continue to operate at reduced power. According to various embodiments, the power of the unaffected motor portion can be increased and/or the power of the unaffected EPUs can be increased to compensate for the loss of thrust from the disabled motor portions.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. An electric aircraft comprising:
   a plurality of rotors for providing lift for vertical take-off and landing of the aircraft;
   a plurality of proprotors that are tiltable between lift configurations for providing lift for vertical take-off and landing of the aircraft and propulsion configurations for providing forward thrust to the aircraft;
   a first battery pack for powering a portion of a first rotor of the plurality of rotors and a portion of a first proprotor of the plurality of proprotors, wherein the first rotor comprises at least two partial motors and the first battery pack powers a first portion of the at least two partial motors;
   a second battery pack for powering a portion of a second rotor of the plurality of rotors, a portion of a second proprotor of the plurality of proprotors, and a second portion of the at least two partial motors of the first rotor;
   a first electric power bus electrically connecting the first battery pack to the portion of the first rotor and the portion of the first proprotor; and
   a second electric power bus electrically connecting the second battery pack to the portion of the second rotor and the portion of the second proprotor, wherein the second electric power bus is electrically isolated from the first electric power bus.

2. The aircraft of claim 1, wherein the first rotor and first proprotor are on opposite sides of the aircraft.

3. The aircraft of claim 1, wherein the first rotor is powered by only the first battery pack and the first proprotor is powered by only the second battery pack.

4. The aircraft of claim 1, wherein the second rotor comprises at least two partial motors, the first battery pack powers a first portion of the at least two partial motors of the second rotor, and the second battery pack powers a second portion of the at least two partial motors of the second rotor.

5. The aircraft of claim 1, wherein an electric circuit connecting the first battery pack to the first rotor and to the first proprotor is free of diodes.

6. The aircraft of claim 1, wherein the first battery pack comprises a plurality of batteries arranged in series, parallel, or a combination of series and parallel.

7. The aircraft of claim 1, wherein the first and second battery packs are configured to generate greater than 100 volts.

8. The aircraft of claim 1, wherein an electric power of at least one of the first rotor and the first proprotor is at least 10 kilowatts.

9. The aircraft of claim 1, wherein the aircraft is manned.

10. The aircraft of claim 1, wherein the aircraft is a vertical take-off and landing aircraft.

11. A method for powering an aircraft comprising:
   powering, by a first battery pack, a portion of a first rotor and a portion of a first proprotor via a first electric power bus electrically connecting the first battery pack to the portion of the first rotor and the portion of the first proprotor; and
   powering, by a second battery pack, a portion of a second rotor and a portion of a second proprotor via a second electric power bus electrically connecting the second battery pack to the portion of the second rotor and the portion of the second proprotor, wherein the second electric power bus is electrically isolated from the first electric power bus;
wherein the first rotor comprises at least two partial motors, the first battery pack powers a first portion of the at least two partial motors, and the second battery pack powers a second portion of the at least two partial motors.

12. An electric aircraft, comprising:
a fuselage;
two wings, the wings extending on opposite sides of the fuselage;
a plurality of rotors configured to provide lift, the rotors mounted to the wings and configured to be disposed aft of the wings during forward flight;
a plurality of proprotors that are tiltable between vertical lift and forward propulsion configurations, the proprotors mounted to the wings and configured to be disposed forward of the wings during forward flight;
a plurality of battery packs, each battery pack configured to power at least:
a portion of one of the rotors mounted to one of the wings; and
a portion of one of the proprotors mounted to the other wing.

13. The electric aircraft of claim 12, wherein the rotors are mounted to the wings via booms.

14. The electric aircraft of claim 12, wherein the proprotors are mounted to the wings via booms.

15. The electric aircraft of claim 12, wherein one of the battery packs is configured to power at least:
a portion of one of the rotors mounted farthest from the fuselage to one of the wings; and
a portion of one of the proprotors mounted farthest from the fuselage to the other wing.

16. The electric aircraft of claim 12, wherein one of the battery packs is configured to power at least:
a portion of one of the rotors mounted nearest to the fuselage to one of the wings; and
a portion of one of the proprotors mounted nearest to the fuselage to the other wing.

17. The electric aircraft of claim 12,
wherein a number of rotors is six, three of the rotors mounted to one of the wings and the other three rotors mounted to the other wing;
wherein a number of proprotors is six, three of the proprotors mounted to one of the wings and the other three proprotors mounted to the other wing;
wherein one of the battery packs is configured to power at least:
a portion of one of the rotors mounted between the other two rotors to one of the wings; and
a portion of one of the proprotors mounted between the other two proprotors to the other wing.

18. The electric aircraft of claim 12, wherein each battery pack is configured to power at least a portion of one of the rotors mounted to one of the wings, and a portion of one of the proprotors mounted to the other wing, via a dedicated electric power bus for that battery pack.

19. The electric aircraft of claim 18, wherein the dedicated electric power buses are electrically isolated from each other.

20. The electric aircraft of claim 15, wherein the one of the battery packs is configured to power at least a portion of one of the rotors mounted farthest from the fuselage to one of the wings, and a portion of one of the proprotors mounted farthest from the fuselage to the other wing, via a dedicated electric power bus for that battery pack.

21. The electric aircraft of claim 16, wherein the one of the battery packs is configured to power at least a portion of one of the rotors mounted nearest to the fuselage to one of the wings, and a portion of one of the proprotors mounted nearest to the fuselage to the other wing, via a dedicated electric power bus for that battery pack.

22. The electric aircraft of claim 17, wherein the one of the battery packs is configured to power at least a portion of one of the rotors mounted between the other two rotors to one of the wings, and a portion of one of the proprotors mounted between the other two proprotors to the other wing, via a dedicated electric power bus for that battery pack.

23. The electric aircraft of claim 12, wherein no two of the battery packs power the same portion of any of the rotors.

24. The electric aircraft of claim 12, wherein no two of the battery packs power the same portion of any of the proprotors.

25. The electric aircraft of claim 12, wherein each rotor is powered by only one of the battery packs.

26. The electric aircraft of claim 12, wherein each proprotor is powered by only one of the battery packs.

27. The electric aircraft of claim 23, wherein at least two of the battery packs power different portions of the one of the rotors.

28. The electric aircraft of claim 24, wherein at least two of the battery packs power different portions of the one of the proprotors.

29. The electric aircraft of claim 27, wherein the at least two of the battery packs power different portions of the one of the proprotors.

30. The electric aircraft of claim 28, wherein the at least two of the battery packs power different portions of the one of the rotors.

31. The electric aircraft of claim 12, further comprising:
a plurality of contactors, each contactor configured to electrically isolate one of the battery packs from at least the portion of one of the rotors mounted to one of the wings and the portion of one of the proprotors mounted to the other wing that it is configured to power.

32. The electric aircraft of claim 31, wherein each contactor is electrically coupled to a positive terminal of its associated battery pack.

33. The electric aircraft of claim 31, wherein each contactor is electrically coupled to a negative terminal of its associated battery pack.

34. The electric aircraft of claim 12, further comprising:
a plurality of fuses, each fuse configured to electrically isolate one of the battery packs from at least the portion of one of the rotors mounted to one of the wings and the portion of one of the proprotors mounted to the other wing that it is configured to power.

35. The electric aircraft of claim 33, wherein each fuse is electrically coupled to a positive terminal of its associated battery pack.

* * * * *